United States Patent
Becherucci et al.

(10) Patent No.: US 6,839,983 B2
(45) Date of Patent: Jan. 11, 2005

(54) HEATING OVEN FOR DYNAMO-ELECTRIC MACHINE COMPONENT MANUFACTURE

(75) Inventors: Raffaele Becherucci, Florence (IT); Gianfranco Stratico, Siena (IT)

(73) Assignee: Axis USA, Inc., Tampa, FL (US)

( * ) Notice: Subject to any disclaimer, the term of this patent is extended or adjusted under 35 U.S.C. 154(b) by 0 days.

(21) Appl. No.: 10/234,919

(22) Filed: Aug. 30, 2002

(65) Prior Publication Data

US 2003/0064341 A1 Apr. 3, 2003

Related U.S. Application Data

(60) Provisional application No. 60/317,580, filed on Sep. 5, 2001.

(51) Int. Cl.$^7$ ................................................ F26B 3/00
(52) U.S. Cl. ............................ 34/443; 34/209; 34/210; 34/215; 34/216
(58) Field of Search ......................... 34/405, 413, 443, 34/465, 509, 510, 235, 218, 132, 523, 201, 209, 210, 215, 216; 156/270, 370.3; 427/58

(56) References Cited

U.S. PATENT DOCUMENTS

| | | | |
|---|---|---|---|
| 1,661,844 A | * | 3/1928 | Miller .................. 427/116 |
| 3,145,127 A | | 8/1964 | Baun |
| 3,261,707 A | | 7/1966 | Korski et al. |
| 3,355,309 A | | 11/1967 | Bender et al. |
| 3,355,310 A | | 11/1967 | De Jean et al. |
| 3,386,382 A | | 6/1968 | Schuette et al. |
| 3,431,887 A | | 3/1969 | Pettigrew et al. |
| 3,440,078 A | | 4/1969 | Sharetts |
| 3,527,502 A | | 9/1970 | Graham |
| 3,646,374 A | | 2/1972 | Jordan et al. |
| 3,660,136 A | | 5/1972 | Guilbault |
| 3,670,699 A | | 6/1972 | Sargent |
| 3,802,380 A | | 4/1974 | Ford et al. |
| 3,809,011 A | | 5/1974 | Fabre |

(List continued on next page.)

FOREIGN PATENT DOCUMENTS

| | | |
|---|---|---|
| CA | 0 974 049 | 9/1975 |
| CH | 381 608 | 10/1964 |
| DE | 37 20 525 | 12/1988 |
| EP | 0 007 207 | 1/1980 |
| EP | 0 321 223 | 6/1989 |
| EP | 0 501 264 B1 | 9/1992 |
| EP | 0 622 128 A1 | 11/1994 |
| EP | 0757425 | 2/1997 |
| FR | 1 494 745 | 9/1967 |
| FR | 2 473 361 | 7/1981 |
| GB | 910 297 | 11/1962 |
| GB | 1001030 | 8/1965 |
| GB | 1 025 492 | 4/1966 |
| JP | 57-13951 | 1/1982 |
| JP | 61076049 A2 | 9/1984 |
| JP | 62-54137 | 3/1993 |
| WO | WO 79/00756 | 10/1979 |

OTHER PUBLICATIONS

U.S. patent application Ser. No. 10/073,400, filed Feb. 11, 2002, Becherucci et al.

Primary Examiner—Kenneth Rinehart
(74) Attorney, Agent, or Firm—Fish & Neave LLP

(57) ABSTRACT

A heating oven for use in dynamo-electric machine component manufacture is provided. The oven uses forced air heating to raise the temperature of in-process component subassemblies to suitable process temperatures. The heating oven includes a rotating drum mounted in a cabinet. A number of open-ended tubular cradles are disposed in circular arrays between the drum faces. Batches of component subassemblies may be individually loaded into the cradles for heat treatment. Air flow channels are set up in the oven cabinet to evenly distribute heated air through individual cradles. Heated air after passing over the individual in-process subassemblies, exits the cradles through side slots in the cradle walls into the interior of the drum. The exiting air is reheated and recirculated through the heating oven.

29 Claims, 6 Drawing Sheets

U.S. PATENT DOCUMENTS

| | | | |
|---|---|---|---|
| 3,865,610 A | 2/1975 | Goodridge et al. | |
| 3,889,015 A | 6/1975 | English | |
| 3,901,185 A | 8/1975 | Goodridge et al. | |
| 3,921,574 A | 11/1975 | English | |
| 4,022,155 A | 5/1977 | Campagna et al. | |
| 4,230,068 A | 10/1980 | Itoh et al. | |
| 4,249,068 A | 2/1981 | Mangan et al. | |
| 4,319,543 A | 3/1982 | Shank | |
| 4,321,281 A | 3/1982 | Itoh | |
| 4,353,941 A | 10/1982 | Bowman | |
| 4,407,854 A | 10/1983 | Pan | |
| 4,475,294 A * | 10/1984 | Henricks | 34/79 |
| 4,517,219 A | 5/1985 | Hajek | |
| 4,565,718 A | 1/1986 | Katsuyama et al. | |
| 4,963,391 A | 10/1990 | Bair et al. | |
| 4,984,353 A | 1/1991 | Santandrea et al. | |
| 5,179,910 A | 1/1993 | Habsburg-Lothringen | |
| 5,258,594 A | 11/1993 | Pioch et al. | |
| 5,331,747 A * | 7/1994 | Stanton | 34/405 |
| 5,401,531 A | 3/1995 | Faraoni et al. | |
| 5,443,643 A | 8/1995 | Cardini et al. | |
| 5,470,615 A | 11/1995 | Sbalchiero et al. | |
| 5,540,776 A | 7/1996 | Habsburg-Lothringen | |
| 5,569,439 A | 10/1996 | Cardini et al. | |
| 5,919,308 A | 7/1999 | Galassi et al. | |
| 6,015,114 A | 1/2000 | Randazzo et al. | |
| 6,024,795 A | 2/2000 | Galassi et al. | |
| 6,226,857 B1 | 5/2001 | Becherucci | |
| 6,325,199 B1 | 12/2001 | Becherucci et al. | |

* cited by examiner

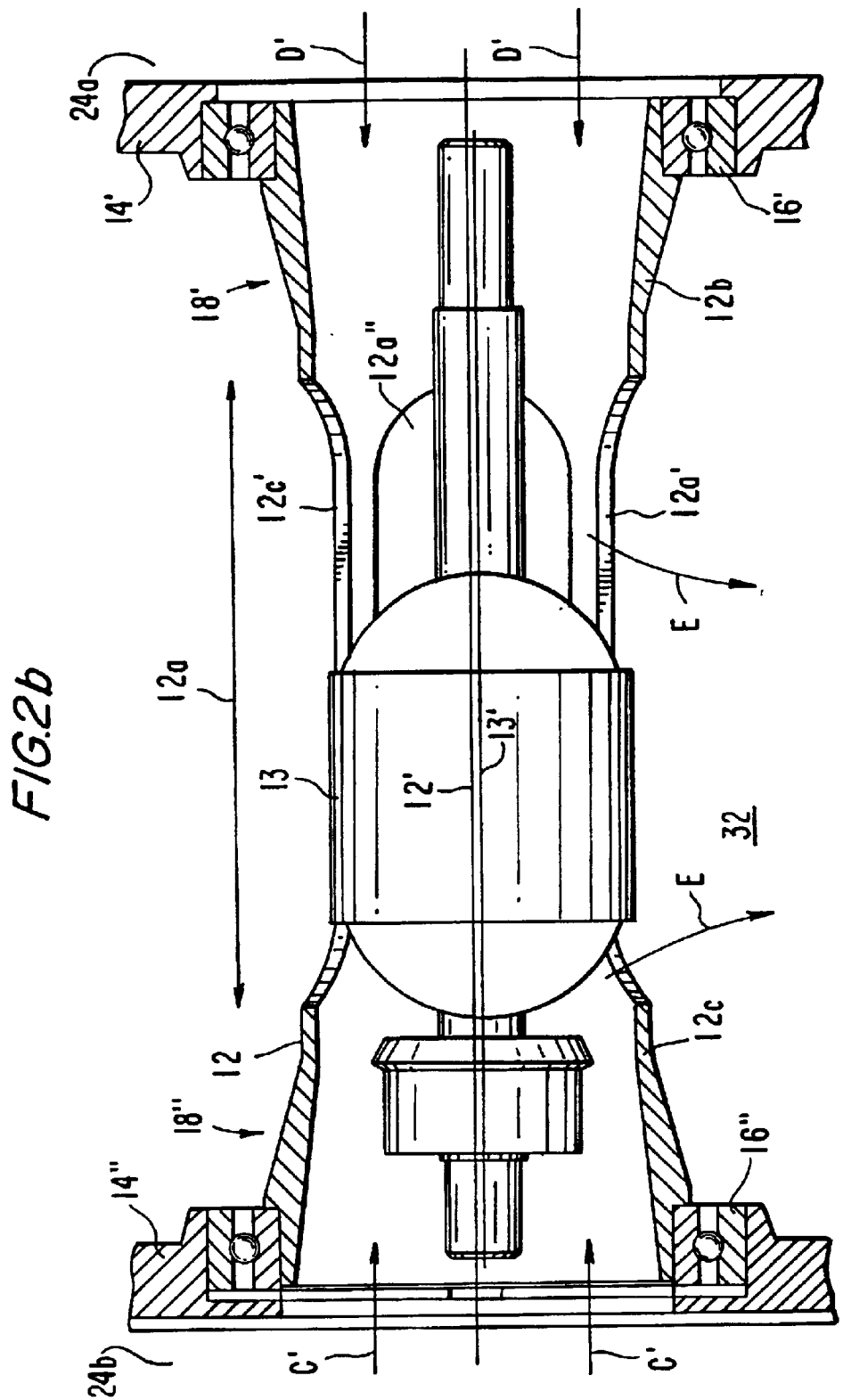

HEATING OVEN FOR DYNAMO-ELECTRIC MACHINE COMPONENT MANUFACTURE

This application claims the benefit of U.S. provisional application No. 60/317,580 filed Sep. 5, 2001.

BACKGROUND OF THE INVENTION

The present invention relates to improved solutions for processing dynamo-electric machine components (e.g., armatures or stators for electric motors, generators, or alternators) through resin application process steps.

Resin application steps are common in the manufacturing of dynamo-electric machine components. The dynamo-electric machine components such as armatures include insulated wire coils wound on ferromagnetic cores. Electric current passes through the wire coils in the operation of the dynamo-electric machine in which the component is used. For optimal performance of the dynamo, the dynamo-electric machine components' wire coils may be subject to tight dimensional tolerances. However, the wires in the coils, which are mechanically wound, are susceptible to loosening due to vibration or heat during further manufacturing or assembly steps. Operation of the dynamo-electric machine itself also may cause vibrations and heat, which tend to loosen the wire coils. Electrical current, which passes through the wire coils, also may generate electromechanical forces that tend to loosen or deform the wire coil shapes. To avoid distortion of the wire coil dimensions due to these or other causes, the wires in a coil are customarily coated and encased in a hard bonding material matrix such as a hardened resin coating. The hard resin coating mechanically stabilizes the wire coil by binding the wires in the coil together and thereby preventing relative movement of the wires. Additionally, the resin coating provides a heat conduction path to dissipate heat generated in the wires. The resin coating also protects the wire insulation from abrasion during further steps of the manufacturing process and during the operation of the dynamo-electric machine.

The resin coating process steps are carried out in the dynamo-electric machine component manufacturing process using resin application stations. The resin application stations may, for example, include resin impregnation machines in which liquid dispensers trickle liquid resins on to the wire coils. The dispensed liquid resin impregnates the wire coils by filling up interwire spaces, for example, by capillary action. Alternatively, resin impregnation machines may dip the wire-coil components in liquid baths to coat the wires with liquid resin. A resin application station usually also involves additional machines such as preheating units for preparing the dynamo-electric machine components for liquid resin impregnation, and resin-curing machines for curing or hardening the impregnated liquid resin.

In the resin-curing or hardening machines, the impregnated liquid resins, which generally are polymeric materials, are converted from a liquid state to a three-dimensionally cross linked hard solid state by chemical (polymerization) reactions. These chemical reactions are temperature dependent. Often the resin curing reactions are effective only in a narrow range of elevated temperatures. The resin curing machines used in the dynamo-electric manufacturing processes usually are heating furnaces or ovens. Dynamo-electric machine components having wire coils impregnated with liquid resin are heated in the ovens and held for a time period at the elevated "curing" temperatures. The quality of hardening or curing of the impregnated resin may depend on amount of time the resin temperature is within a narrow range of curing temperatures. Non-uniform temperatures across the impregnated resin on a dynamo-electric machine component may adversely affect the quality the hardened resin coating. Further, component-to-component differences or variations in heating may adversely affect manufacturing process uniformity and reproducibility, which are desirable for commercial production.

Consideration is now being given to ways of providing solutions for improving dynamo-electric machine component manufacture. Attention is directed toward preheating units and curing units, with a view to improve the resin coating process, and to improve the overall efficiency of dynamo-electric machine component manufacturing.

SUMMARY OF THE INVENTION

In accordance with the principles of the invention, heating furnaces or ovens for heating dynamo-electric machine component subassemblies to an elevated temperature are provided. The furnaces or ovens may be integrated into manufacturing assembly lines by the use of suitable component holding transfer devices and conveyor apparatus. The heating ovens are designed for uniform and reproducible heat treatment of batches of dynamo-electric machine component subassemblies.

The heat treatment may, for example, involve preheating dynamo-electric machine component subassemblies to condition them for resin application. Alternatively or additionally, the heat treatment may, for example, involve heating component subassemblies to which resin has been previously applied, to induce or accelerate resin curing.

The ovens include an enclosed processing cabinet. Forced air convection in the oven cabinet is used to provide a heated ambient in which the temperature of the in-process subassemblies is raised to suitable processing temperatures. Common air heating units, which may be integrated in the oven structure, provide a flow of heated air. A rotating structure is mounted inside the oven cabinet. A number of subassembly-holding cradles are disposed on the rotating structure for simultaneous processing of a corresponding number of component subassemblies. The cradles have cavities in which subassemblies may be placed for processing. The ends and the sides of the subassembly-holding cradles have inlet and outlet openings. Air pressure gradients are set up across the cradle cavities from the inlet openings to the outlet openings. Air flowing into the inlet openings passes along and around the subassemblies placed in the cradle cavities and exits the cradle cavities through the outlet openings.

Input air flow paths or channels are set up in the oven cabinet using, for example, baffles, to evenly distribute and direct freshly heated air along or over each individual subassembly loaded in the oven cabinet. Further a common air-distribution manifold may be used to evenly or symmetrically feed heated air into the oven cabinet for flow along the paths or channels leading to the individual in-process subassemblies.

Air that has flowed over or around individual in-process subassemblies is gathered as a used air flow along a return path or channel. Suction devices may be used to create a common low pressure region in the oven cabinet to pull or draw air out of the cradle cavities. The inventive ovens may include air-recirculating units (e.g., centrifugal fans or pumps) to force air along closed loop paths through the oven cabinet and the air heating unit. By deploying the air-recirculating units, the used or return air flow can be reheated in the heating unit and recirculated through the oven cabinet.

In one embodiment of the inventive ovens, the subassembly-holding cradles are open-ended tubular structures, which are disposed across the parallel faces of an enclosed drum-like structure, which is disposed inside the oven cabinet. The cradle open ends, which are aligned with corresponding holes in the parallel faces, provide access paths along which air may flow into the cradles and along or over in-process subassemblies held in the cradles. Additional side openings in the tubular cradle walls provide exit paths for the cradle air flows to the interior of the rotating drum-like structure.

The drum-like structure is mounted inside the oven cabinet so that it can rotate on a hollow axial shaft. The hollow axial shaft is open to the interior of the drum-like structure. The outside end of hollow shaft is connected to the input of an air-heating unit. An air-recirculating unit is used to set up closed loop air flow paths starting from the output of the air-heating unit, passing through the oven cabinet, into the cradles through the open tubular ends, out through the cradle side openings into the interior of the drum-like structure, and returning to the input of the air-heating unit through the hollow axial shaft.

Baffles are deployed in the oven cabinet space to provide separate air flow paths through the oven cabinet to the front and back faces of the drum-like structure. This allows similarly heated air flows or streams to enter each subassembly-holding cradle from both of the tubular cradle end openings. Subassemblies, which are held in the cradles, are exposed to these similarly heated air streams from two directions. Used air, which has passed over the individual subassemblies, is collected through the cradle side openings and pulled out through the interior of the drum-like structure and the hollow axial shaft into the air-heating unit. The used air flow is reheated in the air-heating unit.

Additional baffles or other mechanical structures may be used to streamline the air flow by minimizing or reducing air flow dead spaces in the oven cabinet.

BRIEF DESCRIPTION OF THE DRAWINGS

Further features of the invention, its nature, and various advantages will be more apparent from the following detailed description of the preferred embodiments and the accompanying drawings, wherein like reference characters represent like elements throughout, and in which:

FIG. 2b is an enlarged view of a portion of the heating oven of FIG. 2, showing details of a subassembly-holding cradle structure and its disposition in the rotating drum-like structure in accordance with the principles of the present invention.

FIG. 2c is a view of the oven of FIG. 2a illustrating the generally concentric circular configuration of compartmental structures in the oven, as seen from directions 3–3' in FIG. 2a.

Figure 1:
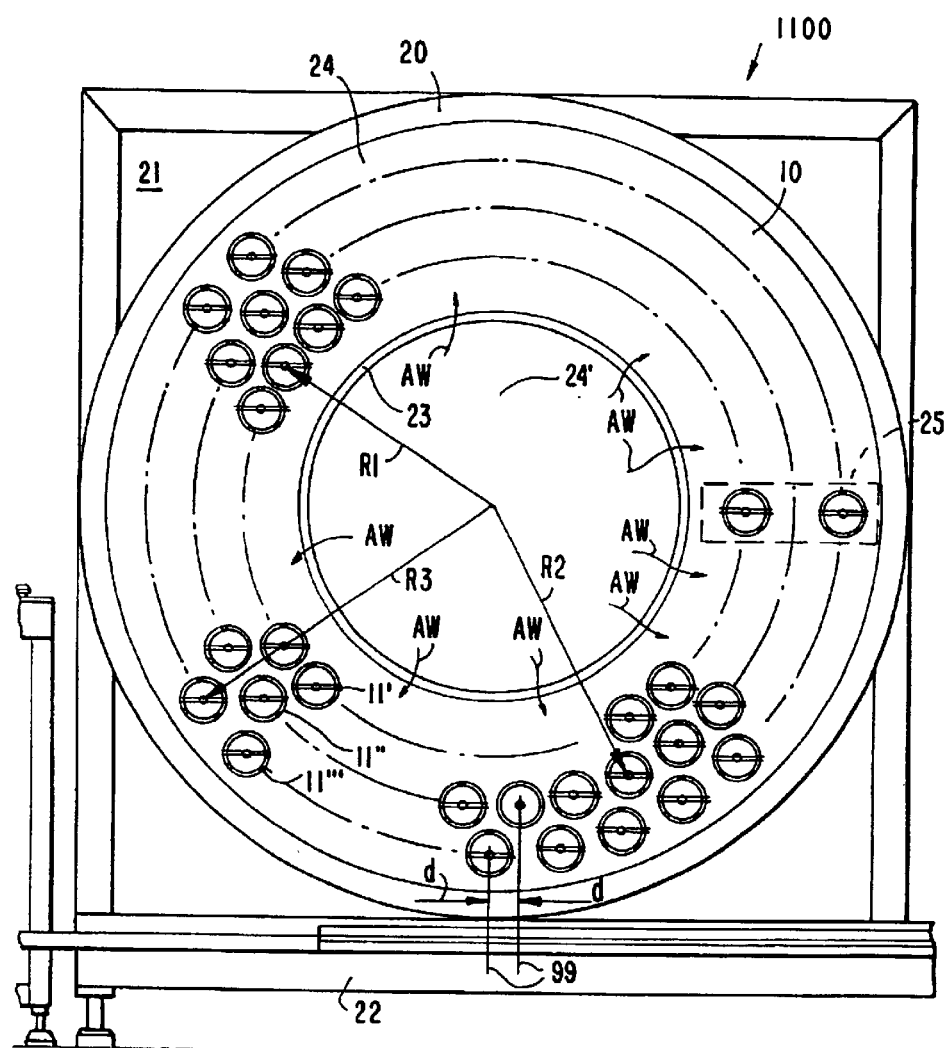
FIG. 1 is a side elevational view of an exemplary heating oven, which has a rotating support structure to hold in-process subassemblies.

In several of the accompanying drawings, which show sectional views, hatching or shading of various sectional elements have been omitted for clarity. It will be understood that this omission of hatching or shading in the drawings is for the purpose of clarity in illustration only.

DETAILED DESCRIPTION OF THE PREFERRED EMBODIMENTS

The present disclosure provides solutions for uniform and reproducible manufacturing of dynamo-electric machine components. A disclosed solution concerns heating furnaces or ovens, which may be used for heating batches of dynamo-electric machine component subassemblies, which have wire coil portions, to elevated processing temperatures.

The disclosed solution may find application in dynamo-electric machine component manufacturing processes where inter- or intra-component processing temperature uniformity is an important process parameter. The disclosed heating furnaces or ovens may be used, for example, as ovens to preheat dynamo-electric machine component subassemblies in preparation for resin application, or as resin-curing ovens. The furnaces or ovens may be integrated into a manufacturing assembly line by the use of suitable conveyor apparatus and component transfer devices. The conveyor apparatus may, for example, carry the component subassemblies in pallets placed on belts running between the furnaces or ovens and other processing machinery in the assembly line. The component transfer devices may be used to move subassemblies between the pallets and the processing machines.

The integration of processing machinery (e.g. resin application work stations) with pallet-conveyor apparatus in dynamo-electric machine component manufacturing assembly lines has been described, for example, in Santandrea et al. U.S. Pat. No. 4,984,353, Cardini et al. U.S. Pat. No. 5,443,643, Cardini et al. U.S. Pat. No. 5,569,439, Faraoni et al. U.S. Pat. No. 5,401,531, Galassi et al. U.S. Pat. No. 5,919,308, Galassi et al. U.S. Pat. No. 6,024,795, Becherucci et al. U.S. patent application Ser. No. 09/409,038, Becherucci et al. U.S. Pat. No. 6,226,857, Sabatino et al. European Patent 0,757,425, and Becherucci et al. U.S. patent application No. 10/073,400, filed Feb. 11, 2002, all of which are hereby incorporated by reference herein in their entireties.

In order that the invention herein described may be easily understood, the subsequent description is set forth in the context of the manufacture of dynamo-electric machine armatures. Armature subassemblies 13 (see, e.g., FIGS. 2a and 2b) are used herein as illustrative work pieces. It will, however, be understood that the invention is equally applicable to other types of dynamo-electric machine components such as stators, etc., and also to components of other types of machines. Further, the present invention is described in the context of heating furnace or oven designs or architectures in which the in-process armature subassemblies are supported or held on rotating support structures. The rotating support structures may be similar to those described in Becherucci et al. U.S. patent application ser. No. 10/073, 400, filed Feb. 11, 2002 (hereinafter "Becherucci et al.").

As an aid to the understanding of the present invention, a limited description of the oven architecture disclosed by Becherucci et al. is included herein. The Becherucci et al. reference discloses a heating unit that includes a rotating support structure to hold in-process armature subassemblies. The rotating support structure is mounted inside a cabinet or enclosure. A number of subassembly support fixtures may be disposed on the rotating support structure for simultaneously processing a corresponding number of armature subassemblies. Forced air convection in the cabinet may be used to provide a heated ambient in which the temperature of the in-process subassemblies is raised to a suitable processing temperature.

Figure 3:
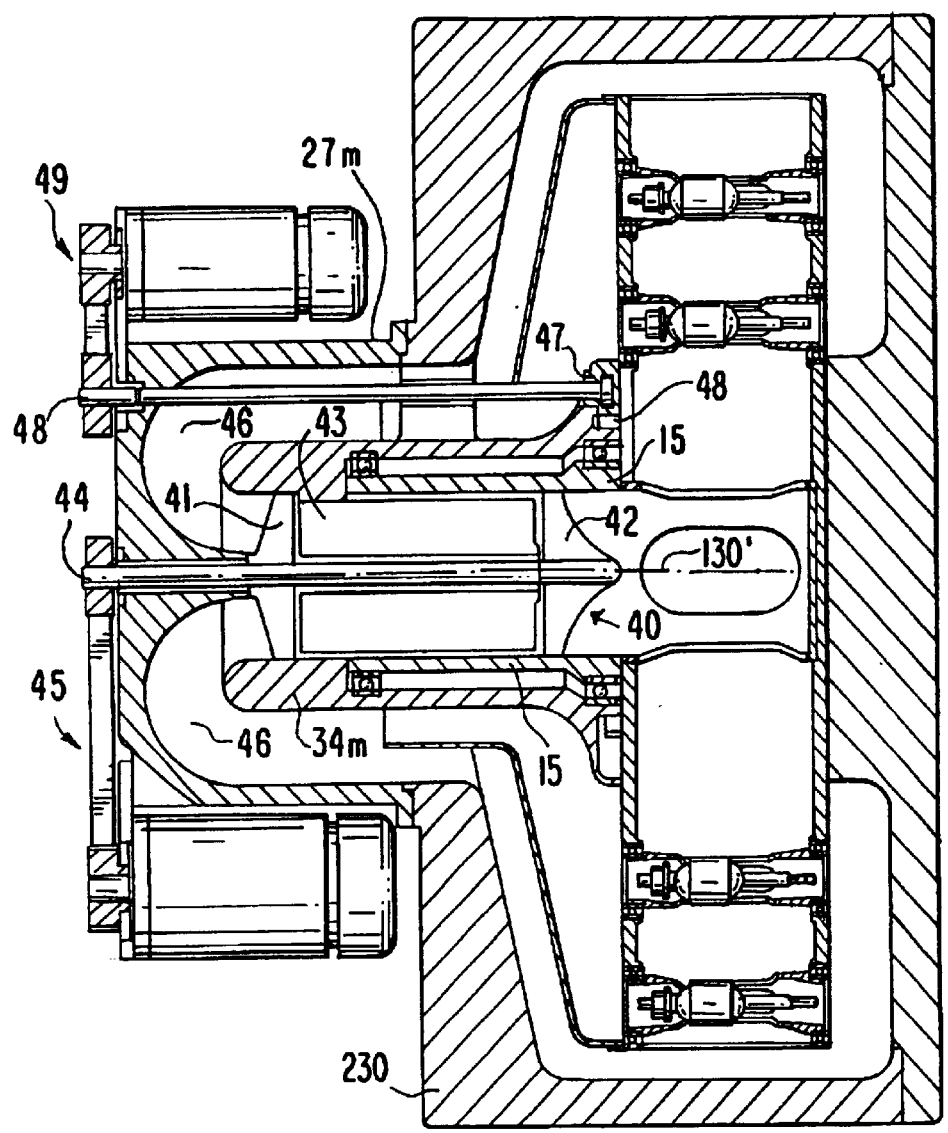
FIG. 3 is a cross sectional view of another heating oven with closed loop air flow paths through the oven cabinet for directing heated air over individual in-process subassemblies in accordance with the principles of the present invention.

FIG. 1 is a view of an exemplary heating unit 1100 disclosed by Becherucci et al., which has a rotating support structure for holding in-process subassemblies. (For purposes of illustration, Becherucci et al. FIG. 3 is renumbered and reproduced herein as FIG. 1.) Vertical support plate 10 is mounted in a cabinet formed by outer cylinder 20, back wall 21, and a front plate (not shown). Outer cylinder 20 is supported on upstanding frame structure 22. Inner cylinder 23 is attached to the front plate such that cylinders 20 and 23 are substantially concentric and form an annular compartment 24 in between. Vertical support plate 10 is attached to a rotatable bearing unit (not shown) mounted on back wall 21. The bearing unit allows vertical support plate 10 to rotate about horizontal axis AX.

A large number of subassembly support fixtures 11 are disposed in concentric circular arrays 11', 11" and 11''' on vertical support plate 10 in compartment 24. The three circular arrays 11', 11", and 11''' are at radius R1, R2, and R3, respectively. Compartment 24 serves to provide a defined space through which support fixtures 11 travel as vertical support plate 10 rotates about its central axis during the operation of preheating unit 1100. Heated air from compartment 24' is forced through openings AW into compartment 24. Armature subassemblies 13 (not shown) may be loaded into or unloaded from individual support fixtures 11 through an aperture 25 (schematically represented in FIG. 1 by dashed lines) in the front plate of compartment 24. The rotation of vertical support plate 10 may be intermittently stepped through the angular separation between adjacent support fixtures (e.g., corresponding to spacing distance d between lines 99) so that consecutive support fixtures 11 are sequentially aligned with aperture 25. Processed subassemblies may be serially removed from aligned support fixtures 11, and be replaced by unprocessed subassemblies.

The general architecture of heating ovens or furnaces having rotating support structures disclosed in the Becherucci et al. reference is used herein only for purposes of illustration, with the understanding that the inventive principles of the present invention are applicable to other component-heating ovens or furnaces in which alternative types of movable structures may be used to support in-process subassemblies. The alternative types of support structures may, for example, be capable of moving in-process subassemblies along a linear path. The movement of such linearly-moving support structures may, for example, be activated by moving chains or belts.

Like Becherucci et al., the inventive furnaces or ovens use forced air heating to raise the temperature of in-process subassemblies. The furnace or oven cabinets are designed to have forced air flow patterns, which promote temperature uniformity across an in-process subassembly and from one in-process subassembly to another. Air flow paths or channels are set up to concentrate and direct heated air along each individual subassembly loaded in the inventive furnaces or ovens. Further, the air flow paths or channels may, for example, be closed loop paths, which are designed to collect and recirculate used air through air-heating sources for reuse. Reheating and recirculation of used air may reduce power consumption and energy costs in the manufacturing process.

Using suitable air-compression or air-suction means, pressure gradients may be set up along the air flow paths or channels to force the flow of air along preferred directions. For example, an air-injection nozzle may be used to direct pressurized air over or along the surface of an individual in-process subassembly. Further for example, suction pumps or fans may be used to draw the air over the in-process subassemblies. The directed flow of heated air along each individual subassembly may allow for more efficient heat transfer to the in-process subassemblies, and may result in a more rapid subassembly temperature response. The temperature of freshly loaded sub-assemblies may be quickly elevated or ramped up to the desired curing temperatures. For some process applications, the inventive furnaces or ovens may be configured for flash heating of in-process subassemblies. For example in some resin-curing processes, intermittent injection of heated air through air-injection nozzles for short time intervals may be used for flash or surface heating of the resin-coated wire coil portions of in-process subassemblies. The heated air used for flash or surface heating may be at temperatures (e.g., 300° C.), which are higher than the subassembly bulk temperatures that are desirable or the temperatures that the subassemblies can safely withstand over extended time periods.

Figure 2A:
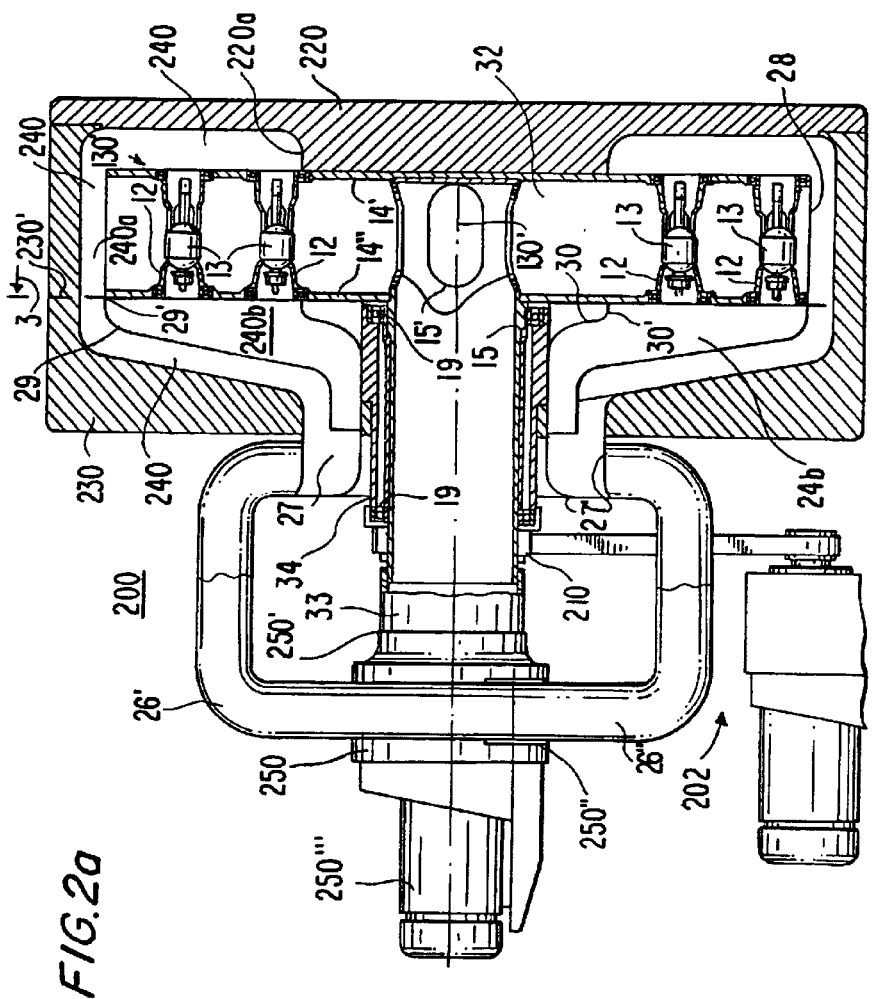
FIG. 2a is a cross sectional view of a heating oven with closed loop air flow paths through the oven cabinet for directing heated air over individual in-process subassemblies in accordance with the principles of the present invention. The in-process subassemblies are held in subassembly-holding cradles disposed in an rotating drum-like structure.

An embodiment of the present invention is described herein with reference to FIGS. 2a, 2b, 2c, and 2d. FIG. 2a shows an exemplary oven 200 having heated air flow directed along or over individual in-process armature subassemblies 13. Oven 200 includes a generally cylindrical-shaped processing compartment 240 having concentric annular subcompartments 240a and 240b. Processing compartment 240 is formed by cylindrical wall 230', central support structure 34 walls, back wall 230, and front wall or cover plate 220. Central support structure 34 may be a conduit or hollow tube, which is attached to and extends across or through back wall 230. The hollow tube may, for example, be attached to back wall 230 by radial arms or tabs 34' (FIG. 2c), or by other suitable mechanical means. Plating 27' protrudes from back wall 230 to form an annular collector chamber or manifold 27 around central support structure 34. Suitable openings or cutouts in back wall 230 provide air flow conductivity between compartment 240 and collector manifold 27. Compartment 240 walls (e.g., back wall 230) and other oven 200 components may be supported on an upstanding frame or base structure on the assembly line floor (not shown). Oven 200 may, for example, be used for the subassembly-preheating step in assembly line resin application stations. Alternatively or additionally, oven 200 may be used for the resin-curing step in the resin application stations.

In oven 200, in-process armature subassemblies 13 are held in cradles 12 that are disposed in a rotating drum structure 130. Drum structure 130 itself is disposed within compartment 240 so that it can rotate around its cylindrical axis 130'. Drum structure 130 includes an inner compartment 32 formed by cylindrical wall 28, central support structure 34 walls, and circular front and back end plates 14' and 14", respectively. One or more concentric circular arrays of cradles 12 may be disposed in compartment 32 with cradle axes 12' running parallel to drum axis 130'. Oven 200 has, for example, three concentric circular arrays of cradles 12, in a pattern, which, for example, may be similar to the pattern of support fixtures on circular arrays 11', 11", and 11'" in heating unit 1100 (FIG. 1).

Cradles 12 are designed to support and carry in-process armature subassemblies 13. FIG. 2b shows, for example, an exemplary cradle 12. Cradle 12 has a tubular structure, which is open at both ends 18' and 18", and straddles or extends between front and back end plates 14' and 14", respectively. Open ends 18' and 18" of the tubular structure are aligned with holes in front and back end plates 14' and 14", respectively. These aligned holes in plates 14' and 14" provide air flow conductivity between subcompartments 240a and 240b, respectively and the interior cavities of cradles 12. Additionally, openings 18' and the corresponding aligned holes in front plate 14' may be sufficiently large to provide an unobstructed passageway through which armature subassemblies 13 may be placed in, or removed from cradles 12.

Cradle 12 tubular structure has a central portion 12a, and front end and back end portions 12b and 12c, respectively, which abut central portion 12a. One or more longitudinal cutouts or slots 12a" in the cylindrical sides of central portion 12 give it a cage-like form with longitudinal ribs 12a' (that are formed between adjacent slots 12a") extending between end portions 12b and 12c. Central portion 12a shown in FIG. 2b has, for example, four equally spaced cutouts or slots 12a", and four resultant longitudinal ribs 12a' running parallel to cradle axis 12'. Slots 12a" provide an exit pathway for air flow from the tubular interior of cradles 12 to drum compartment 32.

Central portion 12a may have an inner diameter, which is substantially uniform over its length. The inner diameter may be chosen with regard to the diameter of the stack portion of an armature 13 to provide adequate dimensional clearances for smoothly loading armatures into, and unloading armatures out from cradle 12. Armature 13, which is loaded in cradle 12 is seated or placed so that its stack portion rests on and is supported from below by bottom longitudinal ribs 12a'. Longitudinal axis 13' of resting armature 13 may lie slightly below cradle axis 12'.

In contrast to the relatively uniform inner diameter of central portion 12a, end portions 12b and 12c may have flared cylindrical shapes with diameters that increase with distance away from central portion 12a toward respective open ends 18' and 18". End portions 12b and 12c may be respectively mounted in a pair of bearing ring assemblies 16' and 16" that are disposed parallel to each other on the opposing interior faces of plates 14' and 14". Bearing ring assemblies 16' and 16" may be any suitable ball or roller bearing assemblies that allow cradle 12 to idle along axis 12' as drum structure 130 rotates around its axis 130'. With this arrangement, armature subassembly 13, which is placed in cradle 12 with its longitudinal axis 13' lying slightly below cradle axis 12', does not rotate around its longitudinal axis 13' as drum structure 130 rotates around drum axis 130' (FIG. 2a).

With renewed reference to FIG. 2a, the rotation of drum structure 130 around axis 130' may be accomplished by turning axial shaft 15, which is attached to plates 14' and 14". Axial shaft 15, which is seated in central support structure 34, may have a hollow tubular structure extending across back end plate 14" through inner compartment 32 to the interior face of front end plate 14'. Cutouts 15' in axial shaft 15 walls between plates 14' and 14" may provide air flow conductivity between axial shaft 15 lumen and compartment 32. Axial shaft 15 may be seated horizontally in central support structure 34 on bearings 19. Bearings 19 may be any suitable load carrying ball or roller bearing structures, which allow drum structure 130 to rotate around horizontal axis 130'.

The rotation of drum structure 130 may be actuated by any suitable mechanical or electromechanical drive means. FIG. 2a shows, for example, electric motor and belt assembly 202, which may be used to turn shaft 15 and thereby rotate drum structure 130. Electric motor and belt assembly 202 includes an electric motor, which may be supported by the frame structure of oven 200 or other suitable base structures on the assembly line floor (not shown). The electric motor drives a belt coupled to a toothed gear wheel 210, which is disposed on shaft 15. Toothed gear wheel 210 may be suitably designed to allow for intermittent rotation or angular stepping motion of drum structure 130. The rotational stepping angles may correspond to the fixed angular spacing between consecutive cradles 12, which are disposed in circular arrays in drum structure 130. In operation, drum structure 130 may be stepped through a fixed angular spacing (e.g., in a manner similar to that described in Becherucci et al.), so that consecutive cradles 12 are sequentially aligned with a loading/unloading aperture (not shown) in front plate 220.

Individual armature subassemblies 13 may be sequentially loaded and/or unloaded from sequentially aligned cradles 12. Armature subassemblies 13 may be translated along their longitudinal axes 13' in or out of openings 18' through front plate 220 aperture during the loading/unloading operations. Common assembly line transfer tools or devices, which are capable of linear translation, may be used to load or unload armature subassemblies 13 from cradles 12.

The loading and unloading operations at oven 200 may be synchronized with parallel loading and unloading operations in adjoining machinery or processing units in an integrated assembly line, to maintain a steady or continuous work flow of subassemblies through the assembly line. The transfer tools used, and the logistics employed to synchronize assembly line loading/unloading operations may, for example, be similar to those described in Becherucci et al. In particular, one (or more) complete revolution of drum 130 returns a newly loaded subassembly to its loading/unloading position aligned with front plate 220 aperture. The rotation speed of drum 130, and time intervals during which processed subassemblies 13 are unloaded from aligned cradles 12 and replaced by new unprocessed subassemblies may be coordinated so that the total time period for one (or more) complete revolution, corresponds to the desired individual subassembly process time in oven 200. The determination of a suitable time period for a complete revolution of drum structure 130 may depend on factors such as the angular spacing between consecutive cradles 12, the temperature ramp rate with which a newly loaded subassembly 13 responds to heating, and other process requirements (e.g., required cure time).

Oven 200 uses forced heated air flow, which is directed along individual in-process subassemblies, to raise and maintain the subassembly temperatures at desired process levels. Any suitable source of heated air may be used. The heat source may be a local source, which is integrated into oven 200 structure (e.g., an electrical heating unit), or an external source (e.g., piped air from an air conditioning plant). FIG. 2a shows, for example, a local heating unit 33 integrated into oven 200 structure. Heating unit 33 may controllably heat air to a suitably high temperature $T_{out}$, using, for example, resistive heating elements. Heating unit 33 is mechanically sandwiched between the back open end of axial shaft tube 15 and suction inlet 250' of a centrifugal fan unit 250. Centrifugal fan unit 250, which includes fan motor 250", may be supported by the frame structure of oven 200 (not shown), or by other suitable support structures on the assembly line floor. Centrifugal fan unit 250 may be used to draw air across heating unit 33 through suction inlet 250', and to eject heated air out of radial outlets 250". The ejected air may be at a temperature, which is substantially the same as $T_{out}$. Ducts 26' and 26" conduct the ejected air from outlets 250" to annular collector chamber or manifold 27. Cutout or holes 27" in back wall 230 (as described earlier) provide air flow conduction to compartment 240. Heated air received into manifold 27 flows into compartment 240 through holes 27".

Suitable baffle structures may be set up in compartment 240 to segregate or direct the heated air flow from manifold 27 to move along two separate channels or paths in compartment 240 leading, respectively, to either openings 18' or openings 18" on opposite faces of drum structure 130. FIG. 2*a* shows, for example, annular outer baffle 29, which divides compartment 24 into two subcompartments 240*a* and 240*b*. Subcompartments 240*a* and 240*b* are arranged so that former leads to openings 18' and the latter leads to openings 18". Baffle 29 may have a generally conical shape, extending from manifold 27 to the outer rim of plate 14". Subcompartment 240*a*, which is defined by the space exterior to the generally conical shaped baffle 29, extends as an annular cone around sub compartment 240*b* and cylindrical wall 28, and includes the space between plate 14' and front plate 220. Subcompartment 240*b*, which is defined by the space interior to the generally conical-shaped baffle 29, extends from manifold 27 to the face of plate 14'.

Figure 2C:
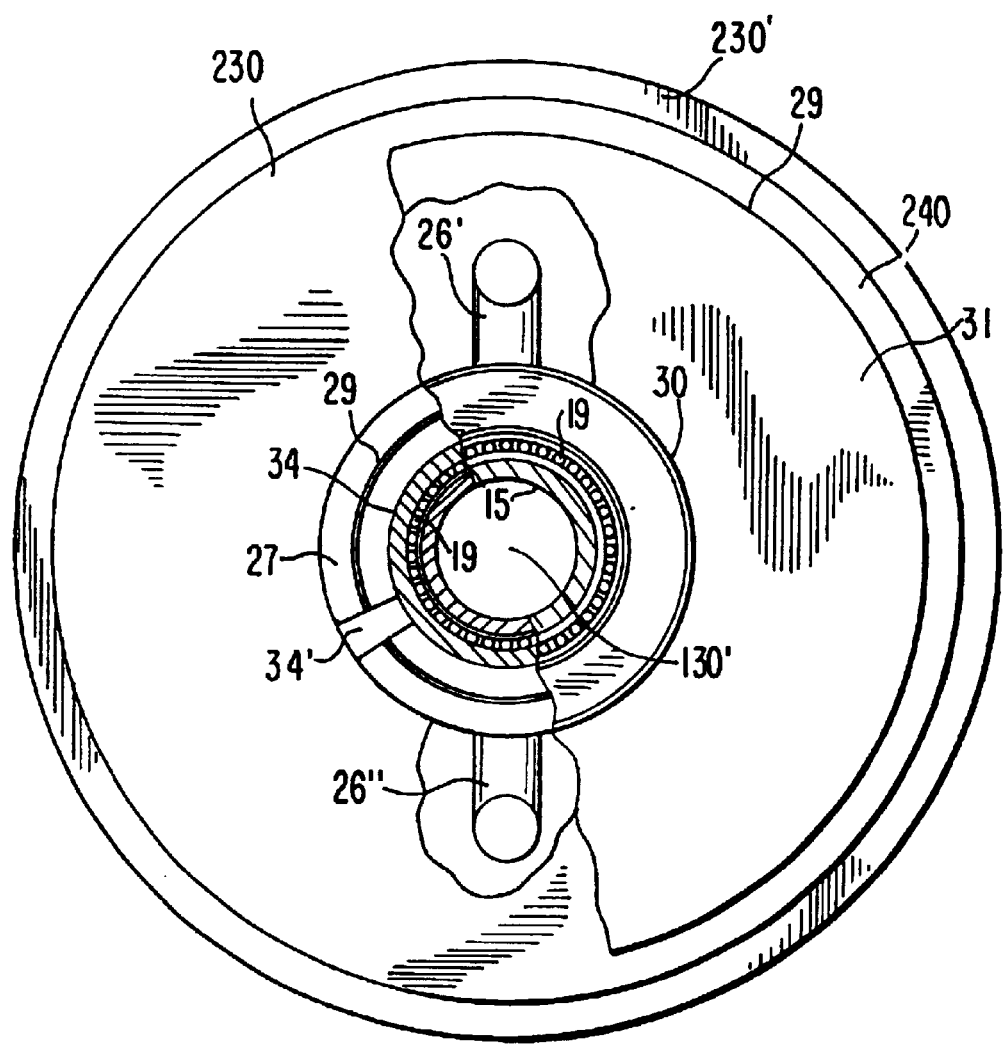

Baffle 29 may, for example, be made suitably shaped sheet metal. Baffle 29 at its narrow conical end may be attached to central support structure 34 using suitable mechanical means. The suitable mechanical means may, for example, be radial arms or tabs that are similar to tabs 34' that are used to attach central support structure 34 to back wall 230 (FIG. 2*c*). Baffle 29 at its wide conical base end or rim 29' makes a sliding mechanical contact with the surface of drum plate 14". The sliding mechanical contact may allow drum 13 to rotate freely, and yet provide an adequate seal to limit air flow between subcompartments 240*a* and 240*b* around rim 27'.

An optional or additional baffle may be used to further narrow or reduce the volume of subcompartment 240*b*. The reduction in the volume of subcompartment 240*b* may be desirable, for example, to streamline air flow by avoiding dead spaces or volumes in the flow path through subcompartment 240*b*. FIG. 2*a* shows, for example, inner baffle 30, which has a generally conical shape similar to that of baffle 29, extending from central support tube 34 to the face of plate 14". The base of conically shaped baffle 30 has a radius, which is smaller than the radius of the innermost circular array of cradles 12 disposed in drum 13. Like baffle 29, baffle 30 may, for example, be made of suitably shaped sheet metal. Baffle 30 at its narrow conical end may be mechanically attached to central support structure 34. In alternative designs of oven 200, baffle 30 may be fabricated as an integral part of central support structure 34 (see e.g., support structure 34*m* FIG. 3). Also like base end or rim 29' of baffle 29, wide base end or rim 30' of baffle 30 may be placed in sliding mechanical contact with the surface of drum plate 14" in a manner which does not hinder the rotation of drum 130 and yet seals or limits air flow around rim 30'.

In addition to baffle 30, other suitable mechanical structures may be incorporated in oven 200 design to reduce air flow dead spaces or volumes. These structures may, for example, be designed to reduce air flow dead spaces or volumes in subcompartment 240*a*. FIGS. 2*a* shows, for example, front cover 220 having an disk-shaped inward protuberance 220*a*, which displaces dead space or volume in a circular region around drum axis 130' between front plate 14' and front plate 220.

The generally circular symmetry of oven 200 structures about drum axis 130' may aid in distributing heated air flow evenly and in providing a uniform processing environment for all subassemblies 13 processed in oven 200. FIG. 2*c*, which is a view taken from direction 3–3' in FIG. 2*a*, illustrates the concentric circular configuration of baffles 29 and 30, compartments 240*a* and 240*b*, collector manifold 27, central support structure tube 34, bearing ring assembly 19, and axial shaft 15, around drum central axis 130', which passes through the center of back wall 230. Additionally in FIG. 2*c*, portions of baffles 29 and 30, and back wall 230 have been removed to show the relative alignment of ducts 26' and 26".

Figure 2D:
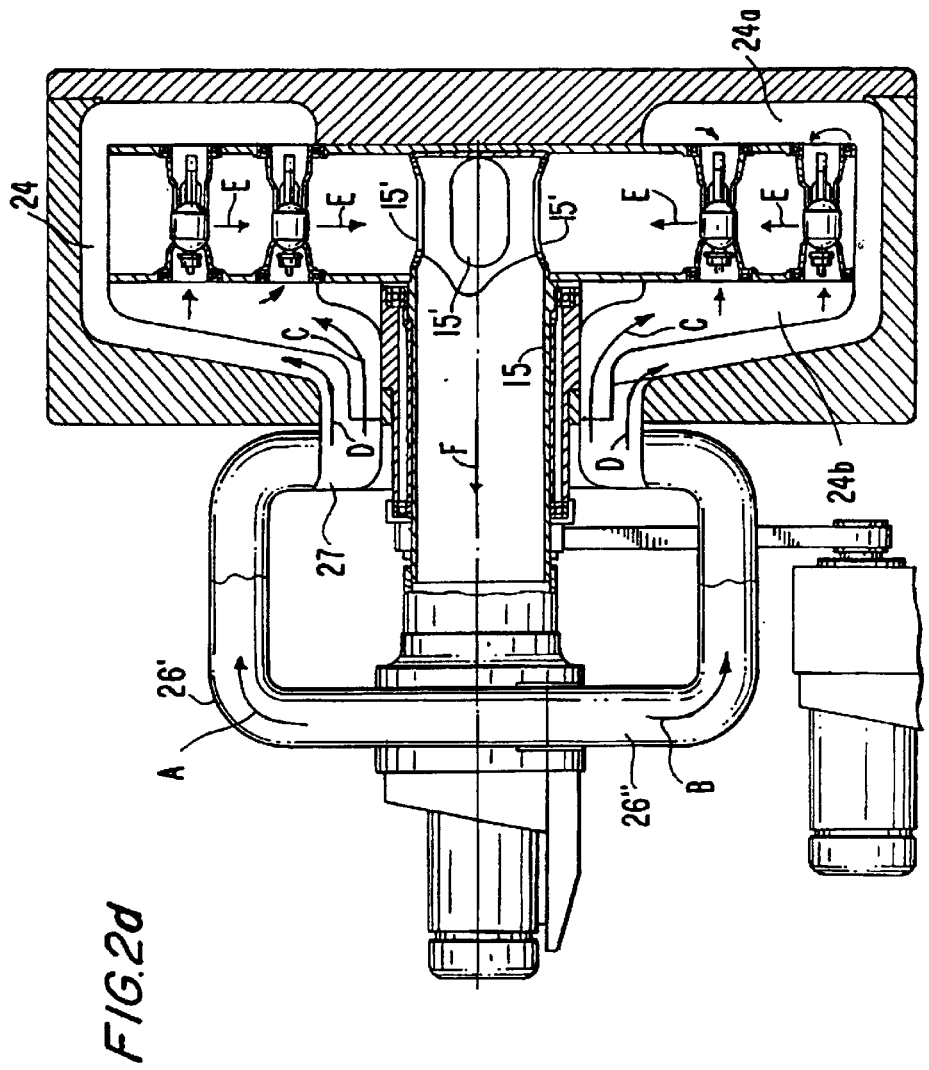
FIG. 2d is a view of the oven of FIG. 2a, illustrating the flow paths through the oven for distributing heated air over individual in-process subassemblies in accordance with the principles of the present invention. The view in FIG. 2d is identical to that shown in FIG. 2a, but several of the element reference characters shown in FIG. 2a have been omitted for clarity.

The flow paths of forced heated air through the various compartments and openings in oven 200 are shown in FIGS. 2*b* and 2*d*. (FIG. 2*d* is a view of oven 200, which is identical to that shown in FIG. 2*a*, but with several of the element reference characters omitted for clarity.) In the operation of oven 200, when motor 250" of fan unit 250 is activated, heated air is drawn from heating unit 33 through suction inlets 250'. Fan unit 250 forces the drawn air along paths A and B through ducts 26' and 26", respectively, leading toward collector manifold 27. The heated air flows along paths A and B combine or mix in collector manifold 27. A portion of the mixed air in collector manifold 27 is forced along path C through compartment 240*b* toward cradle 12 openings 18", which are at the base of compartment 240*b*. The other portion of the mixed air in collector manifold 27 is forced along path D through compartment 240*a* toward cradle 12 openings 18', which are in the base region of compartment 240*a*.

The heated air flow along path C on reaching openings 18" through compartment 240*b* fragments into a plurality of individual air flows or streams, which are forced into cradles 12 along paths C' through openings 18" (FIG. 2*b*.). Similarly, the heated air flow along path D on reaching openings 18' through compartment 240*a* fragments into a plurality of individual air flows or streams, which are forced into cradles 12 along paths D through openings 18' (FIG. 2*b*). The pairs of individual air flows or streams entering cradles 12 along paths C' and D' pass over individual subassemblies 13 resting in cradles 12, and combine to exit cradles 12 into compartment 32 along paths E (FIGS. 2*b* and 2*d*). The air flows or streams over individual subassemblies are generally parallel to the longitudinal axis of the cradles 12. However, exit air flows along paths E are in directions which are generally normal or perpendicular to the longitudinal axis of the cradles 12. The air flows or streams exiting cradles 12 along paths E are drawn toward and into axial shaft 15 through cutouts 15' by the suction force of fan unit 25 (whose suction inlet 25' is connected to axial shaft 15). The air exiting cradles 12 merges in a low pressure region created by the suction force of fan unit 25. The merged air is directed or pulled along path F through axial shaft 15 toward heating unit 33. The returning merged air flow along path F toward heating 33 may be at a temperature $T_{return}$. The returning air flow temperature $T_{return}$ is likely to be lower than $T_{out}$ (the temperature of heated air ejected from fan outlets 250") because of heat transfer to subassemblies 13, and heat losses to surrounding surfaces as the heated air is forced along paths A, B, C, D, E and F. The returning air flow may be reheated in heating unit 33 to the desirable process temperature $T_{out}$. Next, the reheated air may be drawn through suction inlet 250' by fan unit 250 to begin recirculation in a closed loop fashion through oven 200 along flow paths A and B through ducts 26' and 26".

Alternative heating oven embodiments may use local heated air source arrangements, which are different from the combination of heating unit 33 and fan unit 250 described above with reference to oven 200. FIG. 3 shows, for example, heating oven 500, which incorporates a different heated air source arrangement. Heating oven 500, may have a rotating drum structure with support fixtures for holding in-process subassemblies and other structures, which are the same or similar to the corresponding structures in oven 200 described above. However, in addition to a different heated air source arrangement, heating oven 500 uses a different power drive configuration for driving the rotation of the drum structure. For brevity, the description of heating oven 500 herein is limited only to its features that differ significantly from corresponding structural or operational features of oven 200.

Rotation of the drum structure in heating oven 500 may be accomplished using a gear and shaft arrangement. For example, an annular gear wheel 48 may be disposed around horizontal shaft 15. Gear wheel 48 may be meshed with a matching pinion gear 47 mounted on an end of shaft 48. A motor and belt assembly 49 may be used to turn shaft 48 and to thereby impart rotational motion to the drum structure through the coupling of meshed gears 47 and 48.

In heating oven 500 shown in FIG. 3, blower unit 40, which is disposed within hollow axial shaft 15, serves as the source of heated air. Blower unit 40 may be mechanically supported by central support structure 34m, which coaxially surrounds horizontal shaft 15. Blower unit 40 includes a heating unit 43 sandwiched between a front fan wheel 42 and a rear fan wheel 41. Heating unit 43 may be any suitable type of heating unit (e.g., a resistive element heater). Fan wheels 41 and 42 are mounted on shaft 44, which passes through intermediate heating unit 43 and extends out of the rear of blower unit 40. A motor and belt assembly 45 may be used to turn shaft 44 and to thereby rotate fan wheels 41 and 42. Fan wheels 41 and 42 may include blades (not shown), which are suitably oriented so that when fan wheels 41 and 42 rotate air is drawn into heating unit 43 and expelled out of the rear outlet of blower unit 40 into a collector chamber or manifold 46.

Collector manifold 46 may have a generally cylindrical shape around central support structure 34m with an annular passageway leading from the rear outlet of blower unit 40 to the internal compartments of heating oven 500 through openings or holes in back wall 230. The shape of collector manifold 46 may be defined by cylindrical structure 27m, which is attached to back wall 23.

The recirculating flow paths of forced heated air through the various compartments and openings in oven 500 are generally similar to those in oven 200 with few modifications. For example, a modification present in the case of oven 500 relates to the absence of oven 200 ducts 26' and 26", which connect fan unit outlet 250" to collector manifold 27 (FIG. 2c). In oven 500, the function of oven 200 ducts 26' and 26" is accomplished by connecting blower 40 output directly to collector manifold 46. Apart from this modification, the recirculating air flow through oven 500, which includes directed streams of heated air flow over individual in-process subassemblies, may be generally understood by reference to the previous description of corresponding or similar air flows in oven 200 along paths C, D, E, and F (FIGS. 2b and 2d).

One skilled in the art will appreciate that the present invention can be practiced by other than the described embodiment, which is presented for purposes of illustration and not of limitation.

What is claimed is:

1. A heating oven for processing dynamo-electric machine components, comprising:
    a movable support structure;
    a plurality of cradles disposed on said movable support structure, wherein each of said cradles has a cavity having an air-flow inlet opening and an air-flow outlet opening; and
    means for directing heated air through each of said cradles' cavity from said inlet opening to said outlet opening along flow paths which pass over an in-process dynamo-electric machine component disposed in said cavity wherein said cavity has a tubular shape, wherein said outlet opening is disposed on the tubular side of said cavity, wherein substantial portions of said flow paths are substantially parallel to the longitudinal axis of said cavity, and wherein said flow paths exit said cavity through said outlet opening in directions which are substantially normal to said longitudinal axis.

2. The heating oven of claim 1 wherein said means for directing heated air through each of said cradle's cavity further comprises a heated-air source and a common manifold for distributing heated air from said heated-air source to be directed through each of said cradles' cavity.

3. The heating oven of claim 1 wherein said means for directing heated air through each of said cradles' cavity comprises means for establishing a pressure gradient across said cavity.

4. The heating oven of claim 1 wherein said means for directing heated air through each of said cradle's cavity further comprises means for generating a common low pressure region for drawing air from each of said cradles' cavity outlet opening.

5. The heating oven of claim 1 further comprising a conduit for collecting said heated air passing through said cradles.

6. The heating oven of claim 1 wherein said moveable support structure comprises a rotating structure, and wherein said cradles are disposed around the rotational axis of said rotating structure.

7. The heating oven of claim 6 further comprising a hollow tube for collecting air which has passed through said cradles, wherein said hollow tube is substantially coaxial with the rotational axis of said rotating structure.

8. The heating oven of claim 1 wherein said moveable support structure comprises a linearly-moveable structure.

9. The heating oven of claim 1 wherein said means for directing heated air through each of said cradles' cavity further comprises:
    an air heater; and
    a fan coupled to said air heater, wherein said fan has a fan-inlet and a fan-outlet, wherein said fan draws air through said air heater into said fan-inlet by suction, and wherein said fan forces said drawn air through said fan-outlet to be directed through each of said cradles' cavity.

10. The heating oven of claim 9 wherein said air heater comprises resistive heating elements.

11. The heating oven of claim 9 further comprising a cabinet, wherein said movable support structure is mounted in said cabinet, and wherein said fan-outlet leads said forced air into said cabinet.

12. The heating oven of claim 11 further comprising an air-distribution manifold disposed on said cabinet, and wherein said fan-outlet is connected to said cabinet through said air-distribution manifold.

13. The heating oven of claim 11 wherein said fan-inlet is connected to said cabinet and wherein air exiting through said cavity outlet openings is drawn out of said cabinet by a suction force created by said fan.

14. The heating oven of claim 13 wherein said air drawn out of said cabinet is reheated in said air heater and recirculated through said cabinet by said fan.

15. The heating oven of claim 13 wherein said movable support structure comprises a rotatable structure mounted on a hollow axial shaft, and wherein said air drawn out of said cabinet is drawn out through said hollow axial shaft.

16. The heating oven of claim 11 wherein said cabinet further comprises a first baffle to direct said forced heated air flow to said cavity inlet openings.

17. The heating oven of claim 11 wherein said cabinet further comprises a second baffle to reduce air flow dead space in said cabinet.

18. The heating oven of claim 1 wherein said means for directing heated air through each of said cradles' cavity comprises air-injection nozzles.

19. The heating oven of claim 1 wherein said means for directing heated air through comprises means for intermittently injecting heated air through each of said cradles' cavity.

20. A heating oven for processing dynamo-electric machine components, comprising:
   a cabinet, wherein said cabinet comprises: a front cover; a back wall; a central support structure; and a side wall;
   a drum disposed in said cabinet, wherein said drum comprises: a front plate; a back plate; cylindrical side walls; and a hollow axial shaft; wherein said hollow axial shaft is attached to said back plate and is rotatably mounted in said central support structure, and wherein a lumen of said hollow axial shaft is open to the interior of said drum;
   a plurality of open-ended tubular cradles straddling the interior of said drum between said front plate and said back plate such that the open ends of said tubular cradles are aligned with flow openings in said plates, wherein said tubular cradles comprise slots connecting the interior cavities of said tubular cradles to the interior of said drum; and
   an air-recirculating unit comprising an air heater, wherein an outlet of said air-recirculating unit is connected to said cabinet.

21. The heating oven of claim 20 wherein said air heater comprises resistive heating elements.

22. The heating oven of claim 20 wherein said air-recirculating unit further comprises a fan having a fan inlet; and wherein said fan inlet is connected to said air heater.

23. The heating oven of claim 20 wherein said air-recirculating unit is disposed within said hollow axial shaft.

24. The heating oven of claim 20 further comprising a manifold disposed on said cabinet, and wherein an outlet of said air-recirculating unit is connected to said cabinet through said manifold.

25. The heating oven of claim 20 wherein said cabinet further comprises a first baffle to direct a portion of heated air flow received into said cabinet, from said air-recirculating unit to said flow openings in said back plate, and to direct another portion of said received heated air flow to said flow openings in said front plate.

26. The heating oven of claim 20 wherein said wherein an inlet of said air-recirculating unit is attached to said hollow axial shaft, and wherein a suction force of said air-recirculating unit draws air exiting said tubular cradles via said slots into said hollow axial shaft through the interior of said drum.

27. The heating oven of claim 26 wherein said air drawn into said hollow axial shaft is reheated in said air heater.

28. The heating oven of claim 20 wherein said cabinet further comprises a first baffle to establish air flow to paths to said cavity inlet openings.

29. The heating oven of claim 20 wherein said cabinet further comprises a second baffle to reduce air flow dead space in said cabinet.

* * * * *